United States Patent
Matsui et al.

(10) Patent No.: US 10,715,675 B2
(45) Date of Patent: Jul. 14, 2020

(54) TRANSMISSION APPARATUS, TRANSMISSION SYSTEM, TRANSMISSION METHOD, AND PROGRAM

(71) Applicant: ASAHI KASEI KABUSHIKI KAISHA, Tokyo (JP)

(72) Inventors: Shinya Matsui, Tokyo (JP); Kenji Onaka, Tokyo (JP)

(73) Assignee: ASAHI KASEI KABUSHIKI KAISHA, Tokyo (JP)

(*) Notice: Subject to any disclaimer, the term of this patent is extended or adjusted under 35 U.S.C. 154(b) by 151 days.

(21) Appl. No.: 15/908,650

(22) Filed: Feb. 28, 2018

(65) Prior Publication Data

US 2018/0191911 A1  Jul. 5, 2018

Related U.S. Application Data

(63) Continuation of application No. PCT/JP2016/075099, filed on Aug. 26, 2016.

(30) Foreign Application Priority Data

Aug. 28, 2015 (JP) .................................. 2015-169115

(51) Int. Cl.
*H04M 9/08* (2006.01)
*H04R 27/00* (2006.01)
(Continued)

(52) U.S. Cl.
CPC ......... *H04M 9/082* (2013.01); *G10L 21/0208* (2013.01); *G10L 21/0232* (2013.01);
(Continued)

(58) Field of Classification Search
CPC combination set(s) only.
See application file for complete search history.

(56) References Cited

U.S. PATENT DOCUMENTS

2006/0023892 A1  2/2006  Schultz
2010/0124337 A1*  5/2010  Wertz ............... G10K 11/17881
                                                381/71.11
(Continued)

FOREIGN PATENT DOCUMENTS

JP  H11-150798 A  6/1999
JP  2002-051392 A  2/2002
(Continued)

OTHER PUBLICATIONS

International Preliminary Report on Patentability for International Application No. PCT/JP2016/075099, issued by the International Bureau of WIPO dated Mar. 6, 2018.
(Continued)

*Primary Examiner* — Akelaw Teshale

(57) ABSTRACT

An apparatus which allows smooth conversation with improved sound quality to be performed independently of the magnitude of noise or the like in a vehicle. A transmission system is provided, which transmits a sound signal from a first microphone provided corresponding to a first position to a speaker provided corresponding to a second position. A transmission apparatus, a transmission method, and a program include: an evaluating unit which evaluates at least one of a level of a direct sound transmitted from the first position to the second position without intervention of the first microphone and the speaker, a noise level, and an operating state of a noise source; and a delay setting unit which sets a transmission delay from the first microphone to the speaker based on an evaluation result of the evaluating unit.

15 Claims, 9 Drawing Sheets

(51) Int. Cl.
*G10L 21/0208* (2013.01)
*G10L 21/0232* (2013.01)

(52) U.S. Cl.
CPC .... *H04R 27/00* (2013.01); *G10L 2021/02082* (2013.01); *H04R 2227/001* (2013.01); *H04R 2499/13* (2013.01)

(56) References Cited

U.S. PATENT DOCUMENTS

| | | | | |
|---|---|---|---|---|
| 2010/0208911 A1* | 8/2010 | Maeda | ............... | G10K 11/1785 381/73.1 |
| 2012/0071151 A1* | 3/2012 | Abramson | ........ | H04W 12/0802 455/418 |
| 2014/0142958 A1* | 5/2014 | Sharma | ................ | G10L 19/018 704/500 |
| 2014/0337016 A1* | 11/2014 | Herbig | .................. | H04M 3/568 704/201 |
| 2015/0172813 A1* | 6/2015 | Goto | ...................... | H04R 3/002 381/71.1 |
| 2016/0029111 A1* | 1/2016 | Wacquant | ............. | H04R 3/005 381/71.4 |
| 2016/0225366 A1* | 8/2016 | Maeda | ................ | G10K 11/178 |

FOREIGN PATENT DOCUMENTS

| | | |
|---|---|---|
| JP | 2007-150667 A | 6/2007 |
| JP | 2008-153743 A | 7/2008 |

OTHER PUBLICATIONS

International Search Report for International Patent Application No. PCT/JP2016/075099, issued by the Japan Patent Office dated Nov. 15, 2016.

\* cited by examiner

TRANSMISSION APPARATUS, TRANSMISSION SYSTEM, TRANSMISSION METHOD, AND PROGRAM

The contents of the following Japanese patent applications are incorporated herein by reference:
NO. 2015-169115 filed on Aug. 28, 2015, and
NO. PCT/JP2016/075099 filed on Aug. 26, 2016.

BACKGROUND

1. Technical Field

The present invention relates to a transmission apparatus, a transmission system, transmission method, and a program.

2. Related Art

Conventionally, a conversation assistance device has been known, which when occupants riding in an automobile or the like have a conversation, converts a voice sound of a speaking person into an electrical signal by a microphone, performs sound processing on it and transmits it to a listener via a speaker (see Patent Documents 1 to 3, for example).
Patent Document 1: Japanese Patent Application Publication No. 2002-51392
Patent Document 2: Japanese Patent Application Publication No. 2007-150667
Patent Document 3: Japanese Patent Application Publication No. 2008-153743

However, a speaker-playback sound of such a conversation assistance device has a time lag i.e., is delayed relative to a voice sound of the speaking person that directly reaches the listener, due to hardware and software processing. In a situation where noise in the automobile is little enough that a voice sound of the speaking person directly reaches the listener, the listener hears the direct sound and a speaker-playback sound of the conversation assistance device having a time lag, and therefore it has been difficult to continue the conversation, in some cases. Thus, to eliminate the time lag between the direct sound and the speaker-playback sound, an effort has been devised to shorten the delay time from when the sound is converted into an electrical signal by the microphone and sound processing is performed on it to when it is output to the speaker. However, in order to shorten the delay, it is required to shorten a delay due to algorithm of a signal processing unit in addition to a delay associated with hardware. Also, if the delay is shortened, means for performing sound processing is limited, and therefore it has been difficult to improve the sound quality after the sound processing (for example, such as a case where noise is mixedly input to the microphone while driving and suppression of the noise by sound processing is required). Also, if the delay is shortened, sound overlap between the direct sound and the speaker-playback sound of the conversation assistance device is increased, and therefore it is difficult to cancel only echo components by an echo canceller or the like, so that it has been difficult to improve the sound quality after the sound processing.

SUMMARY

Therefore, it is an object of an aspect of the innovations herein to provide a transmission apparatus, a transmission system, a transmission method, and a program, which are capable of overcoming the above drawbacks accompanying the related art. The above and other objects can be achieved by combinations described in the claims. That is, a first aspect of the present invention provides an apparatus which allows smooth conversation with improved sound quality to be performed independently of the magnitude of noise or the like in a vehicle. A transmission system is provided, which transmits a sound signal from a first microphone provided corresponding to a first position to a speaker provided corresponding to a second position. A transmission apparatus, a transmission method, and a program include: an evaluating unit which evaluates at least one of a level of a direct sound transmitted from the first position to the second position without intervention of the first microphone and the speaker, a noise level, and an operating state of a noise source; and a delay setting unit which sets a transmission delay from the first microphone to the speaker based on an evaluation result of the evaluating unit.

The summary clause does not necessarily describe all necessary features of the embodiments of the present invention. The present invention may also be a sub-combination of the features described above.

DESCRIPTION OF EXEMPLARY EMBODIMENTS

The embodiments do not limit the invention according to the claims, and all the combinations of the features described in the embodiments are not necessarily essential to means provided by aspects of the invention.

Figure 1:
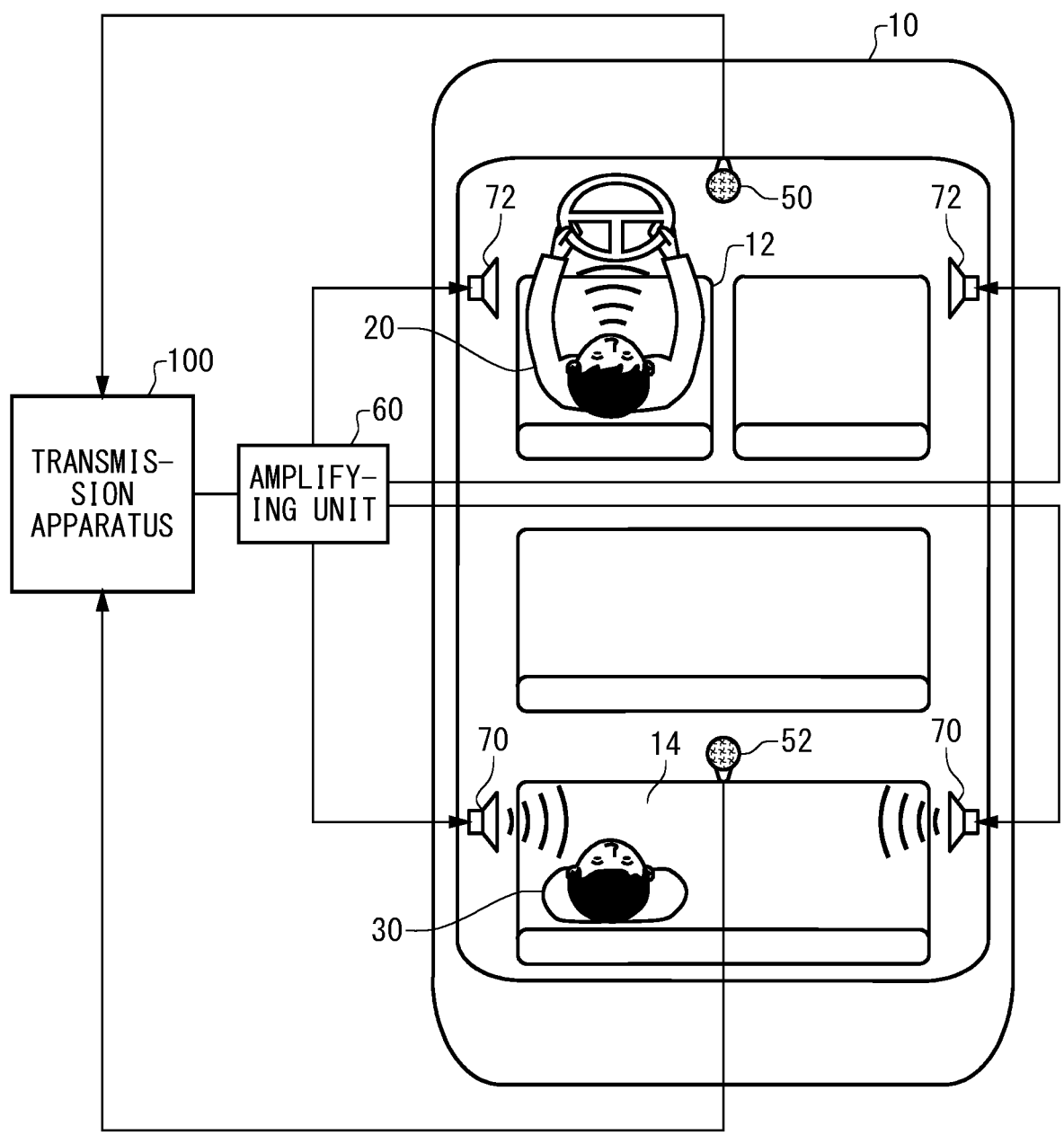
FIG. 1 shows a configuration example of a transmission apparatus 100 according to the present embodiment together with an automobile 10 provided with the transmission apparatus 100.

FIG. 1 shows a configuration example of a transmission apparatus 100 according to the present embodiment together with an automobile 10 provided with the transmission apparatus 100. The automobile 10 includes a plurality of rows of seats on which a plurality of occupants are positioned. FIG. 1 shows an example where an occupant 20 is positioned at a first position 12 in a first row and an occupant 30 is positioned at a second position 14 in a third row. If the occupant 20 and the occupant 30 have a conversation in such an arrangement of occupants, a voice sound of a speaking person that directly reaches a listener (a direct sound) may be buried in surrounding noise or the like, so that it is difficult to continue the conversation.

Thus, the automobile 10 is provided with a transmission system for transmitting a sound signal. The transmission system includes a first microphone 50, a second microphone 52, an amplifying unit 60, a first speaker 70, a second speaker 72, and the transmission apparatus 100.

The first microphone 50 converts a voice sound of an occupant positioned in the first row into an electrical signal. For example, the first microphone 50 converts a voice sound of the occupant 20 positioned at the first position 12 into an electrical signal. The first microphone 50 is preferably provided at the first position 12 or near the first position 12 in order to acquire a voice sound of the occupant 20 positioned at the first position 12.

The second microphone 52 converts a voice sound of an occupant positioned in a row different from the first row into an electrical signal. For example, the second microphone 52 converts a voice sound of the occupant 30 positioned at the second position 14 into an electrical signal. The second microphone 52 is preferably provided at the second position 14 or near the second position 14 in order to acquire a voice sound of the occupant 30 positioned at the second position 14.

The amplifying unit 60 amplifies a sound signal input thereto and outputs it. The amplifying unit 60 may supply the amplified sound signal to the first speaker 70 and the second speaker 72. The amplifying unit 60 may have a function to transmit the amplified signal while delaying it by a set delay time.

The first speaker 70 converts the sound signal into a sound (a sound wave), and outputs it toward an occupant positioned in a row different from the first row. For example, the first speaker 70 converts the sound signal received from the amplifying unit 60 into a sound, and outputs it to the occupant 30 positioned at the second position 14. The second speaker 72 converts the sound signal received from the amplifying unit 60 into a sound, and outputs it toward an occupant positioned in the first row. For example, the second speaker 72 converts the sound signal received from the amplifying unit 60 into a sound, and outputs it to the occupant 20 positioned at the first position 12.

The transmission apparatus 100 performs signal processing on a sound signal supplied from the first microphone 50 and/or the second microphone 52, and supplies the sound signal after the signal processing to the amplifying unit 60. For example, the transmission apparatus 100 transmits a sound signal from the first microphone 50 provided corresponding to the first position 12 to the first speaker 70 provided corresponding to the second position. The transmission apparatus 100 may perform echo cancellation, noise removal, sound level adjustment, filtering and the like.

The above transmission system transmits a voice sound of the occupant 20 to the occupant 30 via the first microphone 50, the transmission apparatus 100, the amplifying unit 60, and the first speaker 70. Such a transmission system may function as a unidirectional ICC (In Car Communication) system.

Alternatively, the transmission system may function as a bidirectional ICC system. In this case, the transmission system may further include a transmission apparatus which transmits a sound signal from the second microphone 52 provided corresponding to the second position 14 to the second speaker 72 provided corresponding to the first position 12. That is, the transmission system transmits a voice sound of the occupant 30 to the occupant 20 via the second microphone 52, the transmission apparatus 100, the amplifying unit 60, and the second speaker 72. By using such a transmission system, the occupant 20 and the occupant 30 can continue the conversation even if the direct sound does not reach the listener due to noise in the vehicle or the like.

Note that, when the automobile 10 drives, the driving state of the automobile 10 changes between parking, stopping, low-speed driving, high-speed driving, and the like. Also, the automobile 10 may drive near a road under construction, a building under construction, a railroad, a factory, an airfield or the like, and noise in the vehicle may be increased to an extent where the direct sound does not reach the listener (an extent where it is inaudible to the listener). On the other hand, the noise in the vehicle may be decreased to an extent where the direct sound reaches the listener (an extent where it is audible to the listener). Also, whether or not the direct sound reaches the listener may depend on the sound volume of the speaking person or the like.

Even if the noise in the vehicle is loud at an extent where the direct sound does not reach the listener, the conversation can be continued by transmitting a voice sound of the speaking person to the listener using the transmission system. However, if the direct sound reaches the listener, two voice sounds i.e., the direct sound and a voice sound transmitted by the transmission system reach the listener. Here, the voice sound transmitted by the transmission system is subjected to signal processing by hardware and software, and therefore a delay occurs due to the signal processing, causing a time difference in the transmission time relative to the direct sound. Accordingly, it becomes hard for the listener to hear the voice sound due to the time difference, and it may be difficult to continue the conversation.

To reduce such a time difference, simplification of the signal processing can be considered. However, it would be difficult to improve the sound quality of a sound signal due to the simplified processing. Also, high-speed signal processing can be considered. In this case, however, the transmission system is required to use hardware, algorithm or the like that performs high-speed signal processing, and it may cause increase in the cost, the circuit scale and the like. Thus, the transmission apparatus 100 according to the present embodiment improves the sound quality of the sound signal without increasing the cost, the circuit scale and the like, regardless of whether or not the direct sound reaches the listener, so as to continue the conversation between the speaking person and the listener. Such a transmission apparatus 100 will be described using FIG. 2.

Figure 2:
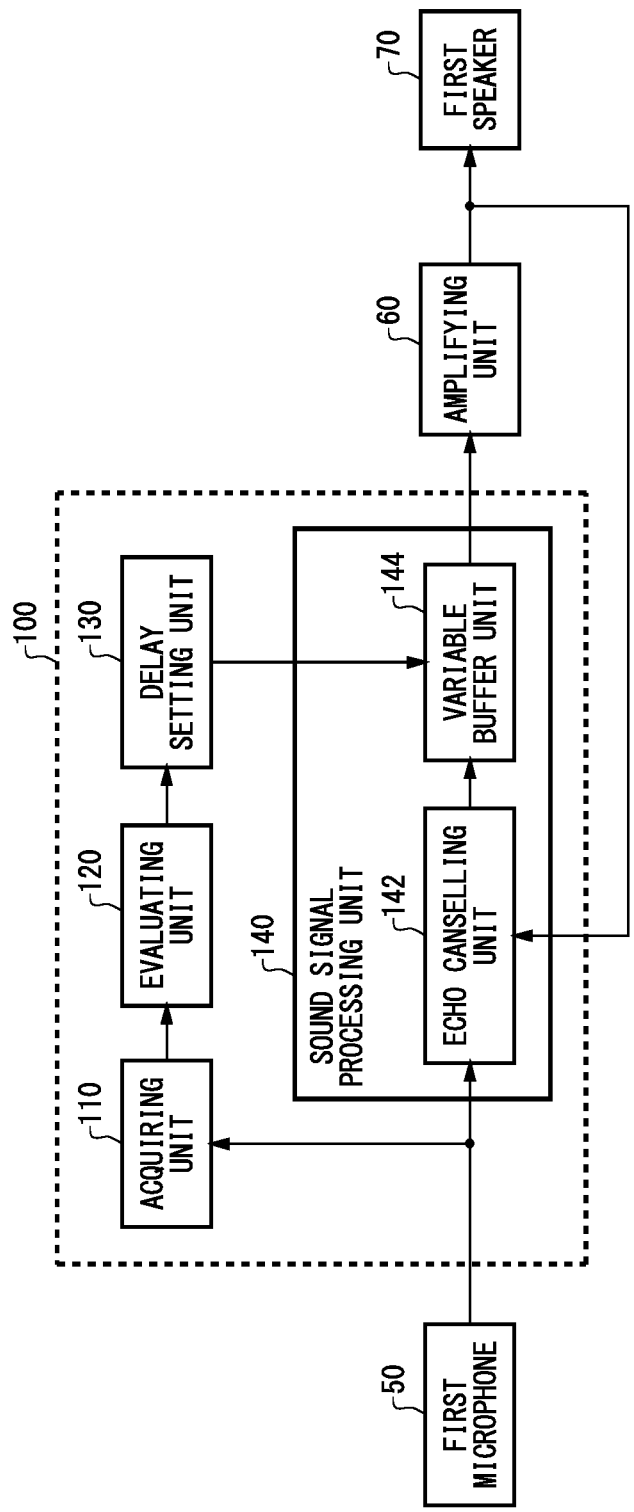
FIG. 2 shows a first configuration example of the transmission apparatus 100 according to the present embodiment.

FIG. 2 shows a first configuration example of the transmission apparatus 100 according to the present embodiment. The transmission apparatus 100 is connected to the first microphone 50 provided corresponding to the first position 12 and the first speaker 70 provided corresponding to the second position 14, and transmits a sound signal from the first microphone 50 to the first speaker 70 while controlling a transmission delay. That is, FIG. 2 shows an example where the occupant 20 is a speaking person and the occupant 30 is a listener. The transmission apparatus 100 includes an acquiring unit 110, an evaluating unit 120, a delay setting unit 130, and a sound signal processing unit 140.

The acquiring unit 110 acquires, without intervention of the first microphone 50 and the first speaker 70, information of a voice sound and/or noise outside the vehicle or in the vehicle which affects a direct sound transmitted from the first position 12 to the second position 14. FIG. 2 shows an example where the acquiring unit 110 acquires a sound signal supplied from the first microphone 50. The acquiring unit 110 supplies the acquired sound information to the evaluating unit 120.

The evaluating unit 120 evaluates at least one of a level of the direct sound, a noise level, and an operating state of a noise source. The evaluating unit 120 may evaluate whether or not the direct sound reaches the listener. FIG. 2 shows an example where the evaluating unit 120 evaluates the noise level or SNR in the vehicle based on the sound signal received from the acquiring unit 110. The evaluating unit 120 supplies a result of the evaluation to the delay setting unit 130.

The delay setting unit 130 sets a transmission delay from the first microphone 50 to the first speaker 70 based on the evaluation result of the evaluating unit 120. For signal processing performed by the transmission apparatus 100, the delay setting unit 130 may set a parameter for processing that causes a delay, or may alternatively set the transmission delay by switching between a plurality of pieces of processing that cause different delays. Also, if a delay adjustment circuit such as a delay line or the like and/or a processing block is arranged on a path from the first microphone 50 to the first speaker 70, the delay setting unit 130 may set a delay time thereof. For example, the delay setting unit 130 may be connected to the amplifying unit 60 to set a delay time of the amplifying unit 60. Also, if the transmission apparatus 100 includes a delay adjustment circuit such as a delay line, the delay setting unit 130 may set a delay time of the delay adjustment circuit. FIG. 2 shows an example where the delay setting unit 130 sets a parameter for delay processing of the sound signal processing unit 140.

The sound signal processing unit 140 performs signal processing on a sound signal input from the first microphone 50, and outputs it to the first speaker 70. For example, the sound signal processing unit 140 performs signal processing for reducing a signal component other than an objective signal in the sound signal input from the first microphone 50, and outputs the sound signal after the signal processing to the first speaker 70. Here, the objective signal may be a sound signal during the interval in which the occupant 20 actually utters the voice sound. The sound signal processing unit 140 performs noise reduction, echo cancellation, howling reduction, filtering, delay processing and/or the like on a sound signal transmitted by the transmission apparatus 100. FIG. 2 shows an example where the sound signal processing unit 140 performs echo cancellation and delay processing. In the present example, the sound signal processing unit 140 includes an echo cancelling unit 142 and a variable buffer unit 144.

The echo cancelling unit 142 attenuates, among signals input to the first microphone 50, a signal input to the first microphone 50 through air propagation of a playback sound from the first speaker 70 (echo). The echo cancelling unit 142 can be realized to estimate an echo component mixedly input to the first microphone 50 based on a sound signal amplified by the amplifying unit 60 or an output signal of the sound signal processing unit 140 (a signal before being amplified by the amplifying unit 60), and subtract the estimated echo component from the signal input from the first microphone 50. Note that the echo cancelling operation performed by the echo cancelling unit 142 is not limited to this, and the echo cancelling unit 142 may cancel echo from the sound signal using a known processing method.

The variable buffer unit 144 is provided in a transmission path from inputting the sound signal from the first microphone 50 to outputting the sound signal after the signal processing to the first speaker 70 (note that the variable buffer unit 144 may be provided external to the sound signal processing unit 140). The variable buffer unit 144 has a buffer function to delay the sound signal input thereto by a variable amount before outputting. The variable buffer unit 144 delays, by a delay time corresponding to the setting of the delay setting unit 130, the sound signal on which the echo cancelling unit 142 has performed echo cancellation processing. Note that the connecting order of the echo cancelling unit 142 and the variable buffer unit 144 is not limited to the connecting order shown in FIG. 2. That is, after the variable buffer unit 144 delays the sound signal by a delay time corresponding to the setting of the delay setting unit 130, the echo cancelling unit 142 may perform echo cancellation processing on the delayed sound signal.

The transmission apparatus 100 of the above first configuration example adjusts a delay time of a sound signal transmitted by the transmission apparatus 100 based on sound information input from the first microphone 50, and thereby improves the quality of sound from the occupant 20 to the occupant 30 in the automobile 10, so as to continue the conversation. Such adjustment of the delay time of a sound signal performed by the transmission apparatus 100 will be described using FIG. 3.

Figure 3:
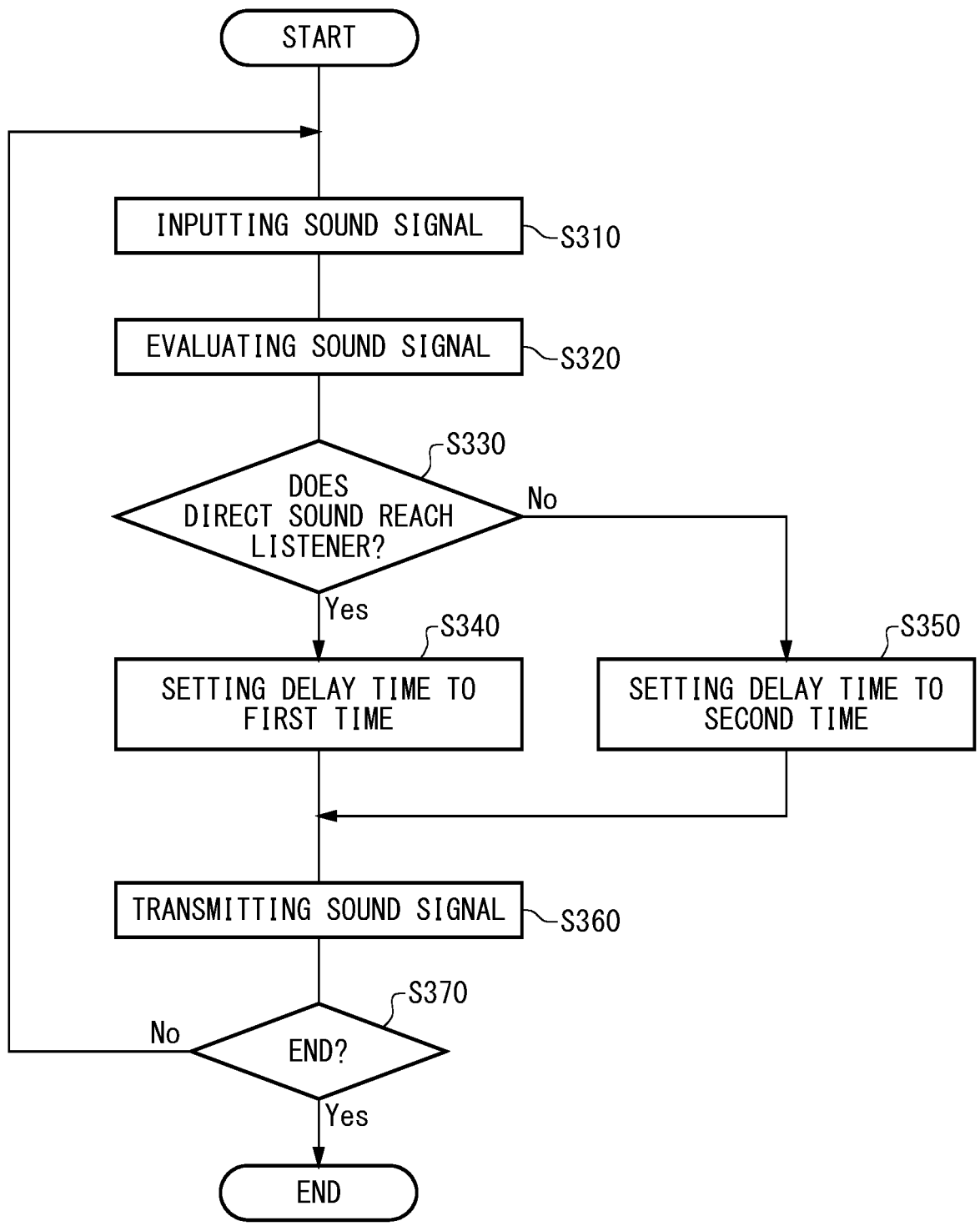
FIG. 3 shows an example of an operation flow performed by the transmission apparatus 100 of the first configuration example according to the present embodiment.

FIG. 3 shows an example of an operation flow performed by the transmission apparatus 100 of the first configuration example according to the present embodiment. First, a sound signal is input to the transmission apparatus 100 from the first microphone 50 (S310). The acquiring unit 110 supplies the sound signal to the evaluating unit 120.

The evaluating unit 120 makes an evaluation based on at least one of a signal level of an objective signal, a noise level, and an S/N ratio in the sound signal input from the first microphone 50, and generates an evaluation result (320). For the evaluating unit 120, the objective signal may be a sound signal during the interval in which the occupant 20 actually utters the voice sound.

For the evaluating unit 120, the objective signal may be a sound signal during the interval in which its signal level is larger than a predetermined threshold in a time-series arrangement. Also, for the evaluating unit 120, the signal level of the objective signal may be the sum of the squares of the amplitudes in the interval of the objective signal. Also, for the evaluating unit 120, a driving noise interval may be defined as an interval of the sound signal other than the objective signal, and the noise level may be the sum of the squares of the amplitudes in the noise interval. Also, for the evaluating unit 120, the S/N ratio may be the ratio of the signal level of the objective signal and the noise level.

When at least one of the signal level and the S/N ratio exceeds a predetermined corresponding threshold, the evaluating unit 120 may evaluate that the direct sound reaches the listener. Also, when at least one of the signal level and the S/N ratio is less than or equal to the predetermined corresponding threshold, the evaluating unit 120 may evaluate that the direct sound does not reach the listener. Also, when the noise level exceeds a predetermined threshold, the evaluating unit 120 may evaluate that the direct sound does not reach the listener. Also, when the noise level is less than or equal to the predetermined threshold, the evaluating unit 120 may evaluate that the direct sound does not reach the listener.

Next, the delay setting unit 130 sets a delay amount of the variable buffer unit 144 according to the evaluation result of the evaluating unit 120 (S330). That is, the delay setting unit 130 sets a transmission delay from inputting the sound signal to the sound signal processing unit 140 from the first microphone 50 to outputting the sound signal after signal processing to the first speaker 70. For example, the delay setting unit 130 sets, according to an evaluation result of the evaluating unit 120 indicating that "the direct sound reaches the listener", the delay time to a shorter first time (S330: Yes, S340). Preferably, in this case, the delay setting unit 130 sets the delay time to the minimum delay time that can be set.

Also, for example, the delay setting unit 130 sets, according to an evaluation result of the evaluating unit 120 indicating that "the direct sound does not reach the listener", the delay time to a second time that is longer than the first time (S330: No, S350). Preferably, in this case, the delay setting unit 130 sets the second time to a predetermined delay time.

Then, the sound signal processing unit 140 performs signal processing on the sound signal input from the first microphone 50, delays it by the delay time set by the delay setting unit 130, and outputs it to the first speaker 70 (S360). In this manner, the transmission apparatus 100 according to the present embodiment transmits the sound signal while adjusting the delay time according to whether or not the direct sound reaches the listener.

Here, if the direct sound reaches the listener, the listener would hear two voice sounds i.e., the direct sound and the output of the transmission system. Accordingly, if the transmission apparatus 100 causes a delay time in signal transmission, the listener would hear the two voice sounds having a time difference in transmission time, so that it may be difficult to listen. Thus, when it is evaluated that the direct sound reaches the listener, the transmission apparatus 100 sets the delay time to the first time so that no time difference occurs between the output of the transmission system and the direct sound. That is, the first time set by the delay setting unit 130 may be a delay time such that the listener perceives no time difference relative to the direct sound. The first time may be a dozen of milliseconds or less. In this manner, the transmission apparatus 100 can output a voice sound with a reduced time difference relative to the direct sound from the transmission system, and therefore the listener does not feel difficulty of hearing, so that the conversation can be continued.

Also, if the direct sound does not reach the listener, the listener would hear the output sound of the transmission system. Accordingly, the listener does not feel difficulty of hearing even if the transmission apparatus 100 causes a delay time in signal transmission. Thus, when it is evaluated that the direct sound does not reach the listener, the transmission apparatus 100 sets the delay time to the second time longer than the first time. By setting the delay time to be longer by the transmission apparatus 100, if a part of a sound signal (a first signal) which is already transmitted to the amplifying unit 60 and amplified is input to the first microphone 50 again and mixed into a sound signal (a second signal), a time difference corresponding to the delay time occurs between the second signal and the mixed signal (the part of the first signal).

When such a time difference occurs between the second signal and the part of the first signal, a temporally overlapping region between the two signals is reduced, and therefore the echo cancelling unit 142 can easily identify a component of the part of the first signal contained in the second signal. That is, by setting the delay time to the second time longer than the first time, the transmission apparatus 100 can improve the precision of signal processing (which is echo cancellation processing herein) of the sound signal processing unit 140. Note that the second time set by the delay setting unit 130 may be a delay time such that the temporally overlapping region between the part of the first signal and the second signal is reduced. For example, the second time is a dozen of milliseconds to dozens of milliseconds.

Until the processing ends (S370: Yes), the transmission apparatus 100 returns to the step S310 of inputting a sound signal, and repeatedly performs the operations of S310 to S360 (S370: No). In this manner, the transmission apparatus 100 can transmit a sound signal on which precise signal processing is performed, and therefore the listener can hear a voice sound with an improved sound quality, so that the conversation can be continued.

As described above, the transmission apparatus 100 according to the present embodiment can improve the sound quality of conversation in the automobile 10 depending on the situation by adjusting the delay time according to an evaluation result of the level of the direct sound for the listener, so that the conversation can be continued. Note that, for the transmission apparatus 100 of the first configuration example, it has been described that the delay setting unit 130 switches the delay time of the variable buffer unit 144 between two times i.e., the first time and the second time. Alternatively, the delay setting unit 130 may select and set any one of a plurality of predetermined delay times according to the evaluation result of the evaluating unit 120.

In this case, the delay setting unit 130 may switch between a plurality of delay times according to the sound volume balance between the voice sound output by the transmission system and the direct sound. Also, when switching the delay time, the delay setting unit 130 may vary the delay time in stages such that the delay time does not change abruptly. Also, if the direct sound reaches the listener, the sound signal processing unit 140 may reduce the sound volume of the sound signal to be transmitted to the first speaker 70, as well as setting the delay time to the first time. Also, if the direct sound does not reach the listener, the sound signal processing unit 140 may increase the sound volume of the sound signal to be transmitted to the first speaker 70, as well as setting the delay time to the second time.

For the transmission apparatus 100 of the above first configuration example, it has been described that the variable buffer unit 144 is used to set the transmission delay from the first microphone 50 to the first speaker 70. Alternatively or additionally, the transmission apparatus 100 may adjust the transmission delay by switching loads of the signal processing of the echo cancelling unit 142. That is, the echo cancelling unit 142 may increase the delay time by performing precise signal processing such as dividing a sound signal into a plurality of bands (or increase the number of division). Also, the echo cancelling unit 142 may reduce the delay time such as by simplifying the signal processing (or not performing the echo cancelling function).

Figure 4:
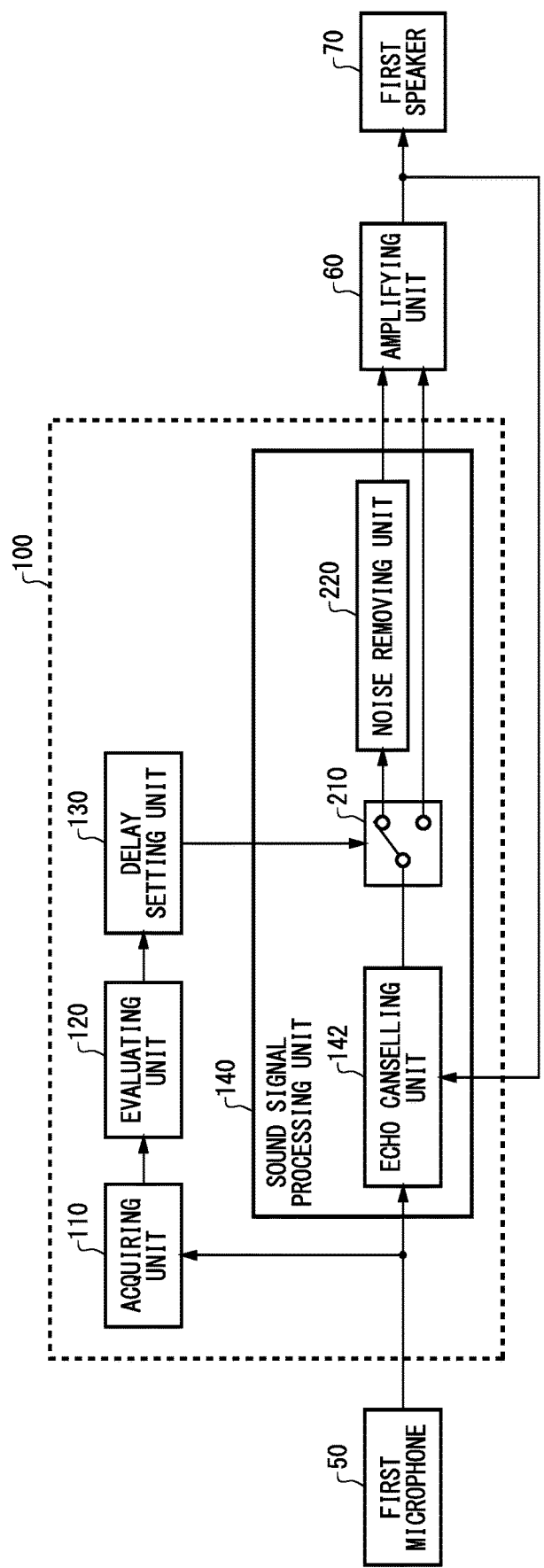
FIG. 4 shows a second configuration example of the transmission apparatus 100 according to the present embodiment.

FIG. 4 shows a second configuration example of the transmission apparatus 100 according to the present embodiment. For the transmission apparatus 100 of the second configuration example, components that operate in substantially the same manner as those of the transmission apparatus 100 of the first configuration example according to the present embodiment shown in FIG. 2 are marked with the same reference numerals, and descriptions thereof are omitted. The transmission apparatus 100 of the second configuration example reduces noise in a sound signal transmitted from the first microphone 50 to the first speaker 70. The sound signal processing unit 140 of the transmission apparatus 100 of the second configuration example includes a switching unit 210 and a noise removing unit 220.

The switching unit 210 switches, according to the setting of the delay setting unit 130, whether or not to bypass noise removal of the noise removing unit 220 in signal processing of a sound signal. The noise removing unit 220 removes at least a part of noise in a sound signal. Here, in the transmission apparatus 100 of the second configuration example, the delay setting unit 130 may set, according to an evaluation result of the evaluating unit 120 indicating that "the direct sound reaches the listener", to bypass the noise removal of the noise removing unit 220. Also, the delay setting unit 130 may set, according to an evaluation result of the evaluating unit 120 indicating that "the direct sound does not reach the listener", to perform the noise removal of the noise removing unit 220.

The noise removing unit 220 may have a function as a noise suppressor, an echo canceller and/or the like to remove at least a part of noise in a sound signal. Also, the noise removing unit 220 may perform a frequency transform on a sound signal to identify a noise component, reduce the noise, and perform an inverse frequency transform on it to restore the sound signal. Note that the noise removal operation performed by the noise removing unit 220 is not limited to this, and noise in a sound signal may be removed using a known processing method.

If the precision of the noise removal is enhanced, such a noise removing unit 220 may require approximately the same processing time as the delay time (the second time, for example) of the variable buffer unit 144 described for the transmission apparatus 100 of the first configuration example. Thus, when it is evaluated that the direct sound reaches the listener, the transmission apparatus 100 of the second configuration example does not perform signal processing by the noise removing unit 220. In this manner, the transmission apparatus 100 can output a voice sound of the speaking person from the transmission system such that the listener perceives no time difference relative to the direct sound. Note that, in a situation where the direct sound directly reaches the listener, it can be regarded that the listener does not feel difficulty of hearing even without reducing noise in the vehicle, and therefore the sound quality is almost not lowered even if the sound signal processing unit 140 performs transmission such that the noise removing unit 220 is bypassed.

Also, when it is evaluated that the direct sound does not reach the listener, the transmission apparatus 100 of the second configuration example performs signal processing by the noise removing unit 220 with a high precision (a long processing time), to remove noise from the sound signal. The signal processing for noise removal causes a delay in signal transmission, so that the precision of the signal processing of the echo cancelling unit 142 can be improved as described for the transmission apparatus 100 of the first configuration example. Accordingly, switching of the switching unit 210 allows the transmission apparatus 100 to improve the precision of signal processing (which is echo cancellation processing and noise removal herein) of the sound signal processing unit 140.

For the transmission apparatus 100 of the above second configuration example, it has been described that whether or not to bypass the signal processing of the noise removing unit 220 is switched according to whether or not the direct sound reaches the listener. Alternatively, the noise removing unit 220 of the transmission apparatus 100 may switch between a plurality of pieces of noise removal processing. Such a transmission apparatus 100 will be described using FIG. 5.

Figure 5:
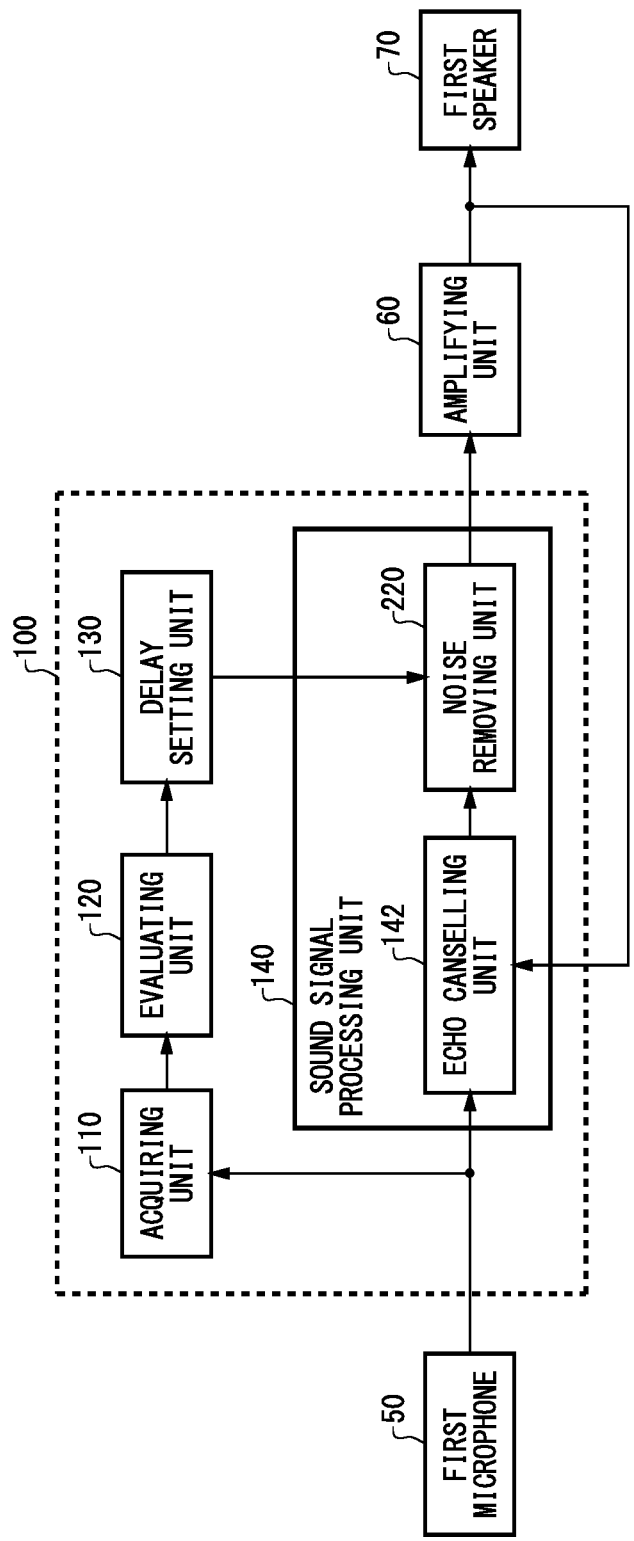
FIG. 5 shows a third configuration example of the transmission apparatus 100 according to the present embodiment.

FIG. 5 shows a third configuration example of the transmission apparatus 100 according to the present embodiment. For the transmission apparatus 100 of the third configuration example, components that operate in substantially the same manner as those of the transmission apparatus 100 of the second configuration example according to the present embodiment shown in FIG. 4 are marked with the same reference numerals, and descriptions thereof are omitted. The transmission apparatus 100 of the third configuration example reduces noise in a sound signal transmitted from the first microphone 50 to the first speaker 70. The sound signal processing unit 140 of the transmission apparatus 100 of the third configuration example includes a noise removing unit 220.

The noise removing unit 220 removes at least a part of noise in a sound signal, and has at least two pieces of noise removal processing with different processing times. The noise removing unit 220 switches between a plurality of pieces of noise removal processing according to the setting of the delay setting unit 130. Here, as the precision of the noise removal processing performed by the noise removing unit 220 increases, the processing time of the noise removal may be increased, that is, the transmission delay in the transmission apparatus 100 may be increased.

In the transmission apparatus 100 of the third configuration example, the delay setting unit 130 selects noise removal processing performed by the noise removing unit 220 and switches to it, based on an evaluation result of the evaluating unit 120. That is, the delay setting unit 130 sets a time required by the noise removing unit 220 for noise removal based on an evaluation result of the evaluating unit 120.

For example, the delay setting unit 130 may set, according to an evaluation result of the evaluating unit 120 indicating that "the direct sound reaches the listener", the noise removing unit 220 to perform noise removal processing with a faster processing speed (noise removal processing with a shorter processing time). In this manner, the transmission apparatus 100 can output a voice sound of the speaking person from the transmission system such that the listener perceives no time difference relative to the direct sound.

Also, the delay setting unit 130 may set, according to an evaluation result of the evaluating unit 120 indicating that "the direct sound does not reach the listener", the noise removing unit 220 to perform noise removal processing with a slower processing speed (noise removal processing with a longer processing time). In this manner, switching of the switching unit 210 allows the transmission apparatus 100 to improve the precision of signal processing (which is echo cancellation processing and noise removal herein) of the sound signal processing unit 140.

Note that the transmission apparatus 100 may switch between a plurality of pieces of noise removal processing according to a degree at which the direct sound reaches the listener. Also, the transmission apparatus 100 may switch between a plurality of pieces of noise removal processing in stages in order to smoothly perform switching of the delay time. Also, while FIG. 3 and FIG. 4 show examples where the transmission apparatus 100 does not include the variable buffer unit 144, the transmission apparatus 100 may alternatively include the variable buffer unit 144 to further adjust the delay time.

Figure 6:
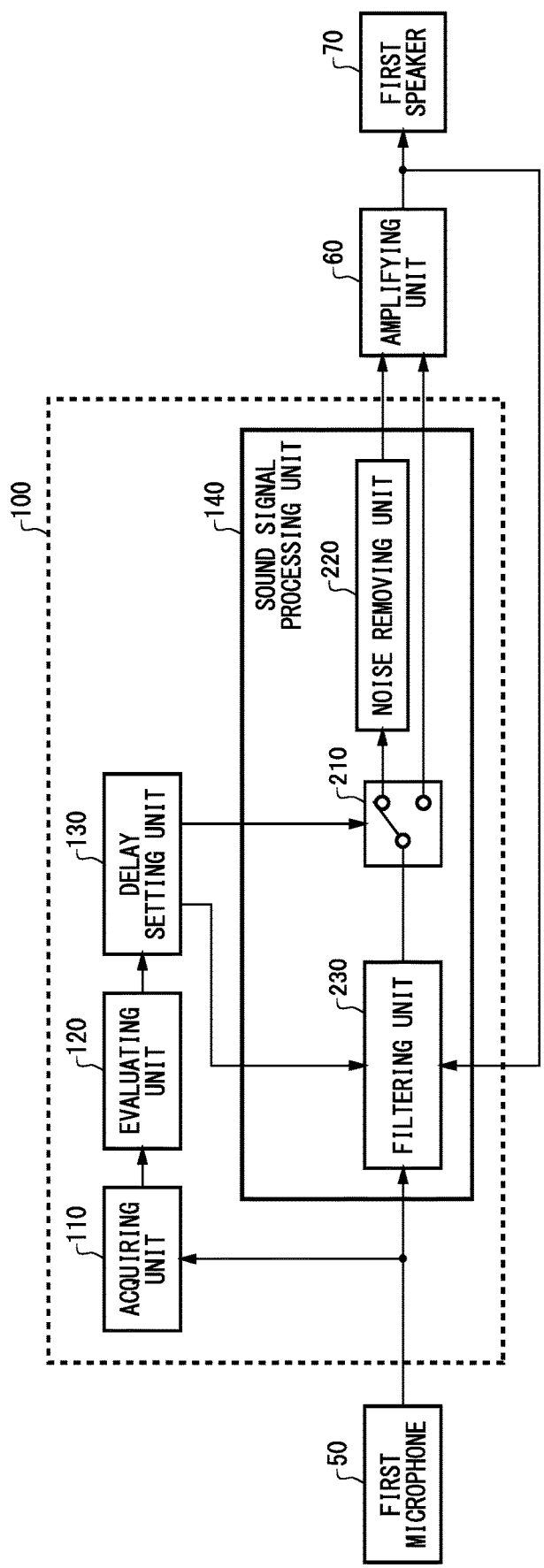
FIG. 6 shows a fourth configuration example of the transmission apparatus 100 according to the present embodiment.

FIG. 6 shows a fourth configuration example of the transmission apparatus 100 according to the present embodiment. For the transmission apparatus 100 of the fourth configuration example, components that operate in substantially the same manner as those of the transmission apparatus 100 of the second configuration example according to the present embodiment shown in FIG. 4 are marked with the same reference numerals, and descriptions thereof are omitted. The transmission apparatus 100 of the fourth configuration example uses the switching unit 210 to switch, according to the setting of the delay setting unit 130, whether or not to bypass the noise removal of the noise removing unit 220 in signal processing of a sound signal, in a manner similar to the transmission apparatus 100 of the second configuration example. The switching operation of the switching unit 210 is described with reference to FIG. 4, and it is omitted herein.

In the transmission apparatus 100 of the fourth configuration example, the sound signal processing unit 140 includes a filtering unit 230. The filtering unit 230 performs filtering on a sound signal. The filtering unit 230 may be a band-rejection (band-pass) filter which rejects (passes) a predetermined band. The filtering unit 230 may be a filter which removes howling, which is amplification of signal intensity at a specific frequency due to repetition of the process in which a part of a voice sound output from the transmission system is input from the first microphone 50. In this case, the filtering unit 230 may be a notch filter which rejects a howling frequency.

The transmission apparatus 100 includes such a filtering unit 230, and therefore it is possible to improve the precision of signal processing (which is noise removal herein) of the sound signal processing unit 140 according to an evaluation result of the evaluating unit 120, while removing howling.

Also, in the transmission apparatus 100 of the fourth configuration example, the delay setting unit 130 may set the number of stages of filtering of the filtering unit 230 based on an evaluation result of the evaluating unit 120. That is, the filtering unit 230 may have a plurality of numbers of stages of filtering, and may switch between the numbers of stages of filtering according to an evaluation result of the evaluating unit 120. In this manner, the filtering unit 230 can switch between filtering processing with a longer processing time and filtering processing with a shorter processing time. That is, the delay setting unit 130 can set the processing time of the filtering unit 230 by setting the number of stages of filtering of the filtering unit 230.

In this manner, the transmission apparatus 100 can improve the precision of signal processing (which is howling removal and noise removal herein) of the sound signal processing unit 140 according to an evaluation result of the evaluating unit 120. Note that, while FIG. 6 shows an example where the sound signal processing unit 140 includes the switching unit 210, the noise removing unit 220, and the filtering unit 230, the sound signal processing unit 140 is not limited to this. The sound signal processing unit 140 may be the combination of the noise removing unit 220 of the third configuration example and the filtering unit 230, the combination of the echo cancelling unit 142 and the filtering unit 230, the combination of the echo cancelling unit 142, the switching unit 210, the noise removing unit 220, and the filtering unit 230, or the combination of the echo cancelling unit 142, the noise removing unit 220 of the third configuration example, and the filtering unit 230.

For the transmission apparatus 100 according to the above present embodiment, an example has been described where the acquiring unit 110 acquires a sound signal from the first microphone 50. Alternatively, the acquiring unit 110 may acquire a sound signal on which signal processing is performed by the sound signal processing unit 140. Such a transmission apparatus 100 will be described using FIG. 7.

Figure 7:
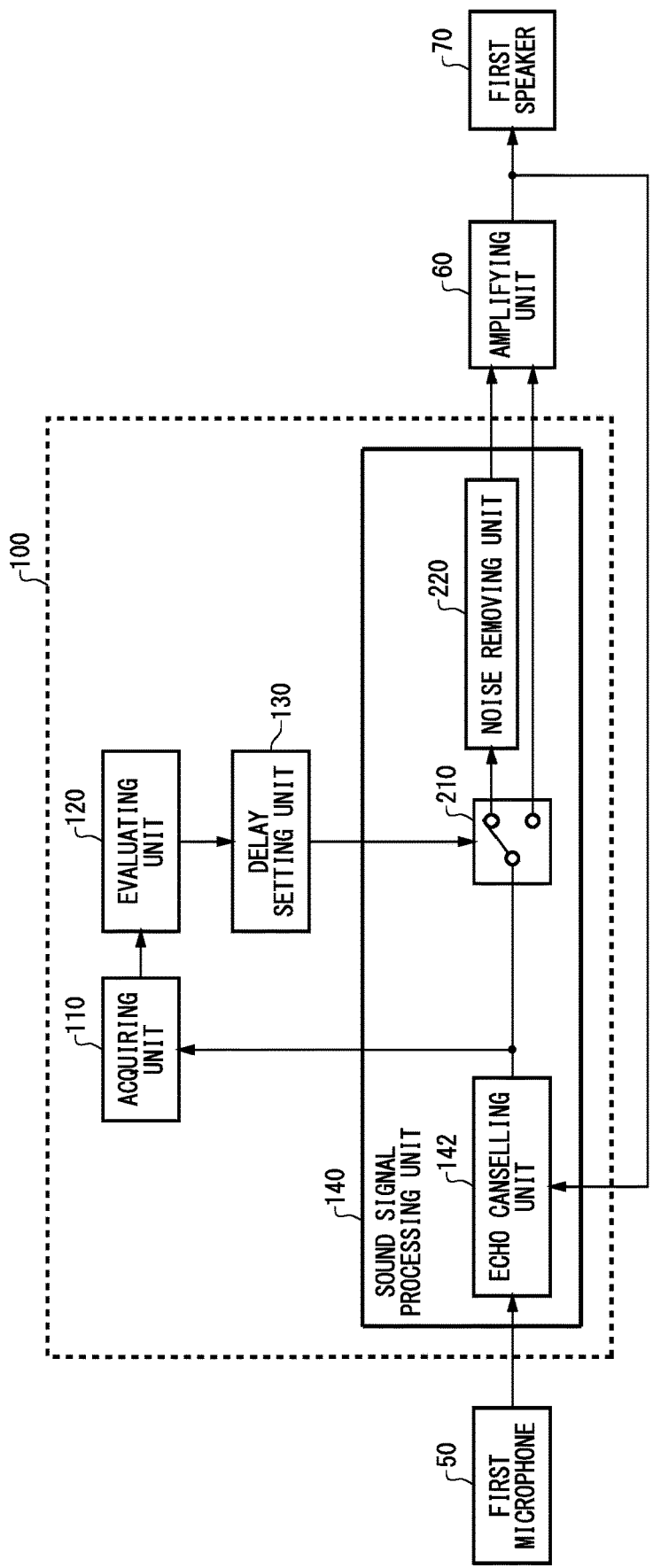
FIG. 7 shows a fifth configuration example of the transmission apparatus 100 according to the present embodiment.

FIG. 7 shows a fifth configuration example of the transmission apparatus 100 according to the present embodiment. For the transmission apparatus 100 of the fifth configuration example, components that operate in substantially the same manner as those of the transmission apparatus 100 of the second configuration example according to the present embodiment shown in FIG. 4 are marked with the same reference numerals, and descriptions thereof are omitted. The transmission apparatus 100 of the fifth configuration example uses the switching unit 210 to switch, according to the setting of the delay setting unit 130, whether or not to bypass the noise removal of the noise removing unit 220 in signal processing of a sound signal, in a manner similar to the transmission apparatus 100 of the second configuration example. The switching operation of the switching unit 210 is described with reference to FIG. 4, and it is omitted herein.

In the transmission apparatus 100 of the fifth configuration example, the acquiring unit 110 acquires a sound signal after the echo cancelling unit 142 performs echo cancellation processing on it. That is, the evaluating unit 120 generates an evaluation result based on a sound signal input from the first microphone 50 and from which echo is cancelled. In this manner, the evaluating unit 120 can make an evaluation using a sound signal with reduced echo, and therefore can more accurately evaluate whether or not the direct sound reaches the listener.

Note that, while FIG. 6 shows an example where the acquiring unit 110 of the fifth configuration example is applied to the transmission apparatus 100 of the second configuration example according to the present embodiment shown in FIG. 4, the transmission apparatus 100 is not limited to this. Even if the transmission apparatus 100 has another configuration including the echo cancelling unit 142, the acquiring unit 110 may acquire a sound signal after the echo cancelling unit 142 performs echo cancellation processing on it.

Figure 8:
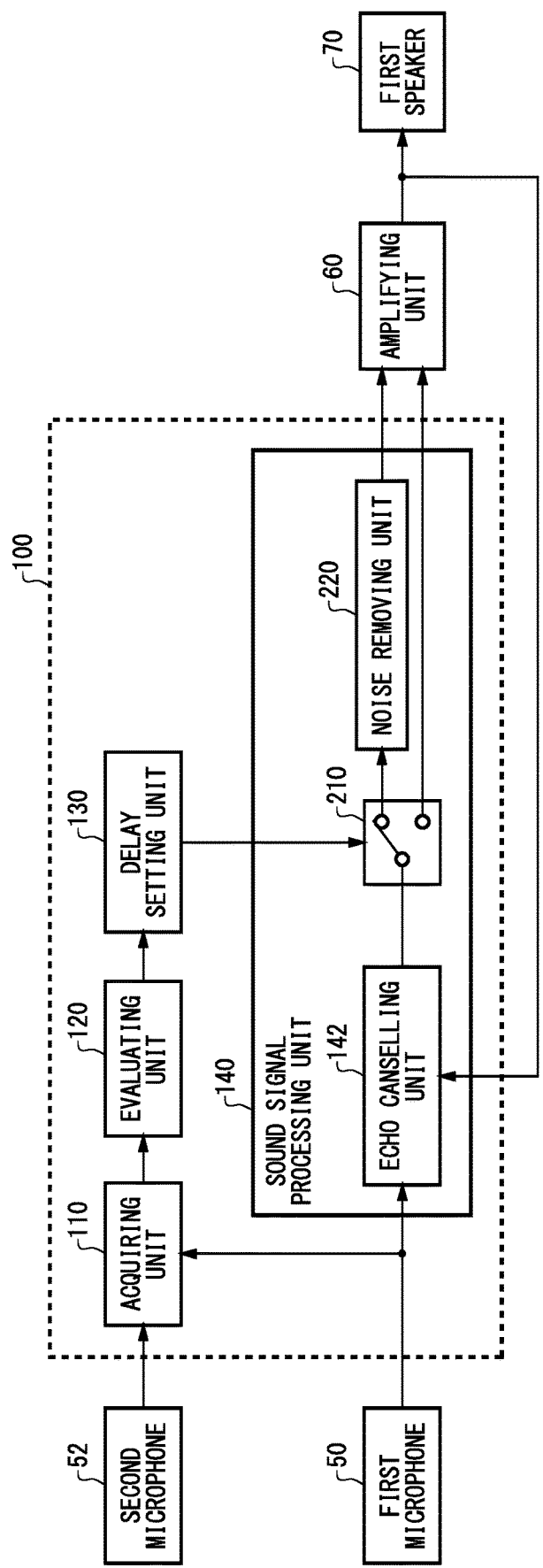
FIG. 8 shows a sixth configuration example of the transmission apparatus 100 according to the present embodiment.

FIG. 8 shows a sixth configuration example of the transmission apparatus 100 according to the present embodiment. For the transmission apparatus 100 of the sixth configuration example, components that operate in substantially the same manner as those of the transmission apparatus 100 of the second configuration example according to the present embodiment shown in FIG. 4 are marked with the same reference numerals, and descriptions thereof are omitted. The transmission apparatus 100 of the sixth configuration example uses the switching unit 210 to switch, according to the setting of the delay setting unit 130, whether or not to bypass the noise removal of the noise removing unit 220 in signal processing of a sound signal, in a manner similar to the transmission apparatus 100 of the second configuration example. The switching operation of the switching unit 210 is described with reference to FIG. 4, and it is omitted herein.

In the transmission apparatus 100 of the sixth configuration example, the acquiring unit 110 acquires a sound signal from the second microphone 52. That is, the evaluating unit 120 generates an evaluation result based on at least one of a signal level of an objective signal, a noise level, and an S/N ratio in a sound signal input from the second microphone 52 provided corresponding to the second position 14. Here, for the evaluating unit 120, the objective signal may be a sound signal during the interval in which the speaking person actually utters the voice sound. In this manner, the evaluating unit 120 evaluates a voice sound of the speaking person that reaches the listener positioned at the second position 14

(that is, a direct sound), and therefore can more accurately evaluate whether or not the direct sound reaches the listener.

For the evaluating unit 120, the objective signal may be a sound signal during the interval in which its signal level is larger than a predetermined threshold in a time-series arrangement. Also, for the evaluating unit 120, the signal level of the objective signal may be the sum of the squares of the amplitudes in the interval of the objective signal. Also, for the evaluating unit 120, a driving noise interval may be defined as an interval of the sound signal other than the objective signal, and the noise level may be the sum of the squares of the amplitudes in the noise interval. Also, for the evaluating unit 120, the S/N ratio may be the ratio of the signal level of the objective signal and the noise level.

Here, the acquiring unit 110 may also acquire a sound signal from the first microphone 50 in addition to the sound signal from the second microphone 52. In this manner, the evaluating unit 120 can make an evaluation by comparing a sound signal based on a voice sound of the speaking person and a sound signal based on surrounding sound on the listener's side. For example, the evaluating unit 120 may evaluate a sound signal by calculating an S/N ratio using a signal component of a sound signal converted at the first position 12 and a noise component of a sound signal converted at the second position.

Also, even if a sound and/or a voice sound occurs on the listener's side while the speaking person speaks, the evaluating unit 120 can distinguish whether or not a sound signal from the listener's side is of a direct sound by comparing the sound signal from the listener's side and a sound signal from the speaking person's side, and therefore it is possible to prevent the transmission apparatus 100 from malfunctioning. Also, the evaluating unit 120 can compare a sound signal acquired at the first position 12 and a sound signal acquired at the second position, and therefore may perform a calibration or the like using a result of the comparison.

Note that, while FIG. 8 shows an example where the acquiring unit 110 of the sixth configuration example is applied to the transmission apparatus 100 of the second configuration example according to the present embodiment shown in FIG. 4, the transmission apparatus 100 is not limited to this. Even if the transmission apparatus 100 has another configuration, the acquiring unit 110 may acquire a sound signal from the second microphone 52, and may additionally acquire a sound signal from the first microphone 50.

Also, alternatively or additionally, the acquiring unit 110 may acquire a detection result of an external sensor device or the like. For example, the acquiring unit 110 acquires a detection result of a sensor device for detecting the operating state of each part of the automobile 10, a microphone placed outside the automobile 10, and/or the like. That is, if there is a device or the like that is the source of noise which overlaps a direct sound at the second position 14, the acquiring unit 110 may acquire a detection result of the operating state of the device or the like.

Then, the evaluating unit 120 evaluates, as the operating state of a noise source, at least one of the operating state of a power source (that is, an engine) provided to the automobile 10, the operating state of an air conditioner provided to the automobile 10, and movement noise of the automobile 10. In this manner, as the evaluating unit 120 evaluates the operating state of the noise source that causes noise in the vehicle, the transmission apparatus 100 can perform a more precise evaluation of the direct sound.

For the transmission apparatus 100 according to the above present embodiment, it has been described that a transmission system is configured to transmit a voice sound from a speaking person positioned at the first position 12 to a listener positioned at the second position 14. Additionally, the transmission system may transmit a voice sound from a speaking person positioned at the second position 14 to a listener positioned at the first position 12.

That is, the transmission system includes the transmission apparatus 100 according to the present embodiment described in any of FIG. 1 to FIG. 8 as a first transmission apparatus, and may further include a second transmission apparatus which transmits a sound signal from the second microphone 52 provided corresponding to the second position 14 of the first transmission apparatus to the second speaker 72 provided corresponding to the first position 12 of the first transmission apparatus. In this case, the second transmission apparatus may be the transmission apparatus 100 according to the present embodiment described in any of FIG. 1 to FIG. 8.

While an example has been described where the transmission apparatus 100 according to the above present embodiment is provided to the automobile 10, the transmission apparatus 100 is not limited to this. The transmission apparatus 100 can be utilized for a situation where a conversation is made between different positions in a vehicle and the conversation cannot be continued due to noise during movement, for example. That is, the transmission apparatus 100 is provided to a vehicle, and transmits a sound signal from a first microphone and provided corresponding to a first row of the seats of the vehicle as a first position to a speaker provided corresponding to a second row of the seats of the vehicle as a second position.

The vehicle may be, besides an automobile, a ship, an airplane, a helicopter, a train, a vehicle for construction, attraction equipment and/or the like. Also, the installation target of the transmission apparatus 100 is not limited to a vehicle, and may be a construction site, hall facilities, a conference system and/or the like.

Figure 9:
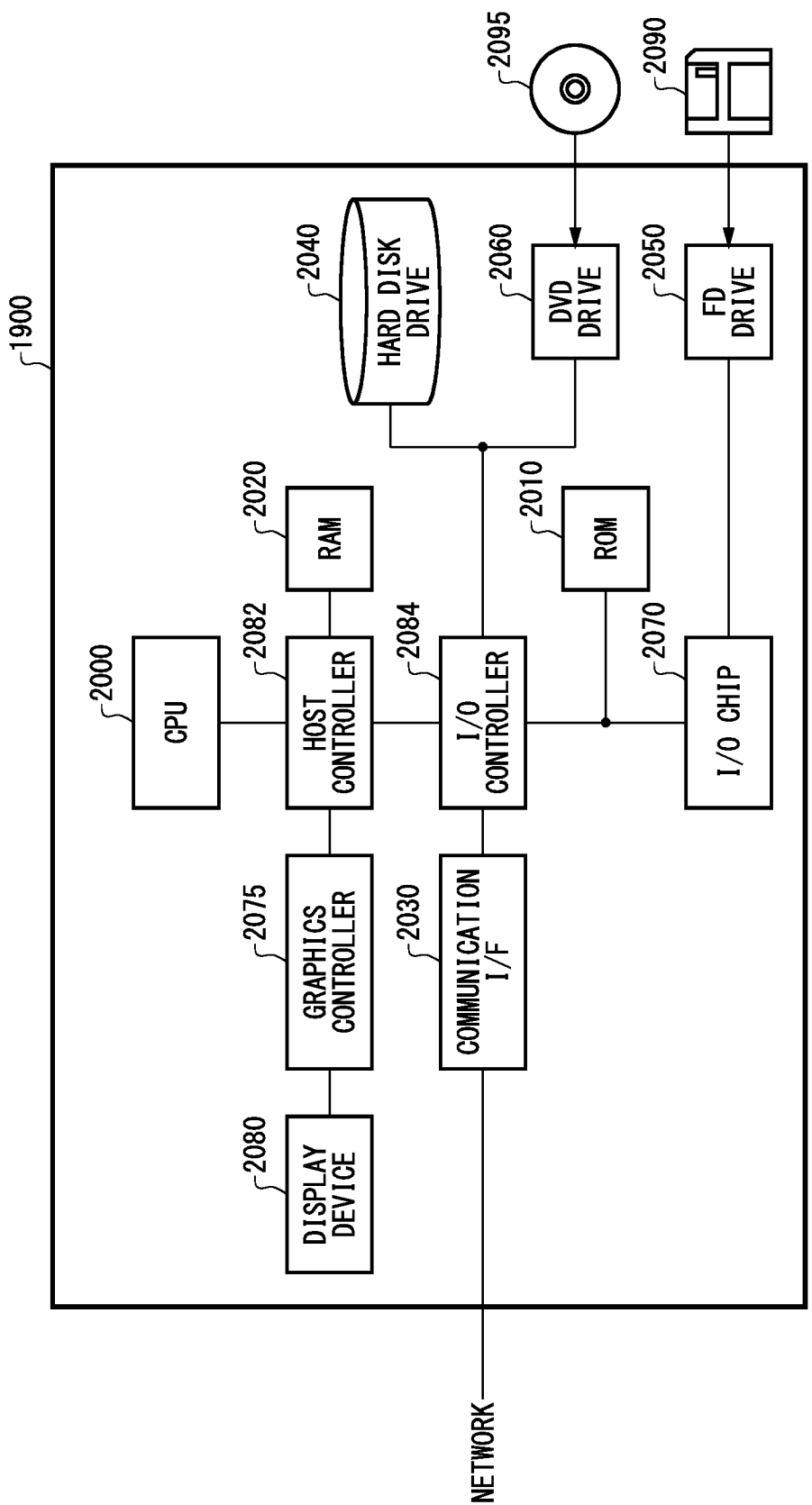
FIG. 9 shows an example of hardware configuration of a computer 1900 which functions as the transmission apparatus 100 according to the present embodiment.

FIG. 9 shows an example of hardware configuration of a computer 1900 which functions as the transmission apparatus 100 according to the present embodiment. The computer 1900 according to the present embodiment includes: a CPU peripheral unit including a CPU 2000, a RAM 2020, a graphics controller 2075, and a display device 2080 which are interconnected by a host controller 2082; an input/output unit including a communication interface 2030, a hard disk drive 2040, and a DVD drive 2060 which are connected to the host controller 2082 by an input/output controller 2084; and a legacy input/output unit including a ROM 2010, a flexible disk drive 2050, and an input/output chip 2070 which are connected to the input/output controller 2084.

The host controller 2082 connects the RAM 2020 to the CPU 2000 and the graphics controller 2075 which access the RAM 2020 at a high transfer rate. The CPU 2000 operates based on a program stored on the ROM 2010 and the RAM 2020, and controls each unit. The graphics controller 2075 acquires image data generated by the CPU 2000 or the like on a frame buffer provided in the RAM 2020, and displays it on the display device 2080. Alternatively, the graphics controller 2075 may include therein a frame buffer that stores image data generated by the CPU 2000 or the like.

The input/output controller 2084 connects the host controller 2082 to the communication interface 2030, hard disk drive 2040, and DVD drive 2060, which are relatively high-speed input/output devices. The communication interface 2030 communicates with other devices via a network. The hard disk drive 2040 stores a program and data to be used by the CPU 2000 in the computer 1900. The DVD drive 2060 reads out a program or data from the DVD-ROM 2095, and provides it to the hard disk drive 2040 via the RAM 2020.

Also, the ROM 2010, and the flexible disk drive 2050 and input/output chip 2070, which are relatively low-speed input/output devices, are connected to the input/output controller 2084. The ROM 2010 stores a boot-program executed by the computer 1900 at the time of start-up, a program that is dependent on hardware of the computer 1900, and/or the like. The flexible disk drive 2050 reads out a program or data from the flexible disk 2090, and provides it to the hard disk drive 2040 via the RAM 2020. The input/output chip 2070 connects the flexible disk drive 2050 to the input/output controller 2084, and also connects various types of input/output devices to the input/output controller 2084 via, for example, a parallel port, a serial port, a keyboard port, a mouse port or the like.

A program provided to the hard disk drive 2040 via the RAM 2020 is provided by a user, being stored in a recording medium such as the flexible disk 2090, the DVD-ROM 2095, an IC card or the like. The program is read out from the recording medium, installed on the hard disk drive 2040 in the computer 1900 via the RAM 2020, and executed in the CPU 2000.

The program is installed on the computer 1900, and causes the computer 1900 to function as the acquiring unit 110, the evaluating unit 120, the delay setting unit 130, the sound signal processing unit 140, the echo cancelling unit 142, the variable buffer unit 144, the switching unit 210, the noise removing unit 220, and the filtering unit 230.

Information processing described in the program functions, by being read by the computer 1900, as the acquiring unit 110, the evaluating unit 120, the delay setting unit 130, the sound signal processing unit 140, the echo cancelling unit 142, the variable buffer unit 144, the switching unit 210, the noise removing unit 220, and the filtering unit 230, which are specific means of software and the various types of hardware resources described above cooperating with each other. By using those specific means to realize information computations or processing according to the usage of the computer 1900 in the present embodiment, the transmission apparatus 100 that is specific to the usage is constructed.

In an example, if communication is performed between the computer 1900 and an external device or the like, the CPU 2000 executes a communication program loaded on the RAM 2020, and instructs, based on the processing contents described in the communication program, the communication interface 2030 to perform communication processing. In response to the control by the CPU 2000, the communication interface 2030 reads out send data memorized in a send buffer region or the like provided on a storage device such as the RAM 2020, the hard disk drive 2040, the flexible disk 2090, or the DVD-ROM 2095 to send it to a network, or writes receive data received from a network into a receive buffer region or the like provided on a storage device. In this manner, the communication interface 2030 may transfer send/receive data to/from a storage device in the DMA (direct memory access) mode, or alternatively, the CPU 2000 may transfer send/receive data by reading out data from a storage device or a communication interface 2030 as the transfer source and writing the data into a communication interface 2030 or a storage device as the transfer destination.

Also, the CPU 2000 causes all or necessary portions of a file, a database or the like stored in an external storage device such as the hard disk drive 2040, the DVD drive 2060 (DVD-ROM 2095), and the flexible disk drive 2050 (flexible disk 2090) to be read into the RAM 2020 by DMA transfer or the like, and performs various types of processing on the data on the RAM 2020. The CPU 2000 performs writeback of the data on which processing is completed into an external storage device by DMA transfer or the like. In such processing, the RAM 2020 can be regarded to temporarily retain contents of the external storage device, and therefore the RAM 2020, the external storage device and the like are collectively referred to as a memory, a memory unit, a storage device or the like in the present embodiment. Various types of information such as various types of programs, data, tables and databases in the present embodiment are stored on such a storage device, and are subjected to information processing. Note that the CPU 2000 can also retain a part of the RAM 2020 on a cache memory so as to perform reading/writing on the cache memory. In such configuration as well, the cache memory serves a part of the function of the RAM 2020, and therefore, in the present embodiment, the cache memory is also regarded to be included in the RAM 2020, a memory and/or a storage device unless that they are indicated discriminately.

Also, the CPU 2000 performs, on data read out from the RAM 2020, various types of processing including various types of computations, information processing, conditional determination, information search/replacement and the like described in the present embodiment and specified in an instruction sequence of a program, and performs writeback of the data into the RAM 2020. For example, when performing conditional determination, the CPU 2000 determines whether various types of variables shown in the present embodiment meet conditions such as being greater than, less than, greater than or equal to, and less than or equal to other variables or constants, and, when a condition is met (or when it is not met), branches to a different instruction sequence or calls a subroutine.

Also, the CPU 2000 can search information stored in a file, database or the like in a storage device. For example, if a plurality of entries, each having an attribute value of a second attribute associated with an attribute value of a first attribute, are stored in a storage device, the CPU 2000 searches, from among the plurality of entries stored in the storage device, an entry having an attribute value of the first attribute that matches a specified condition, and reads out the attribute value of the second attribute stored in the entry, and it is thereby possible to obtain the attribute value of the second attribute associated with the first attribute that meets a predetermined condition.

The programs or modules shown above may also be stored in an external recording medium. The recording medium used may be, besides the flexible disk 2090 and the DVD-ROM 2095, an optical recording medium such as DVD, Blu-ray (registered trademark) or CD, a magneto-optical recording medium such as MO, a tape medium, a semiconductor memory such as an IC card or the like. Also, a storage device such as a hard disk or a RAM provided to a server system connected to a dedicated communication network or the Internet may be used as the recording medium, and a program may be provided to the computer 1900 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A transmission apparatus which transmits a sound signal from a first microphone provided corresponding to a first position to a speaker provided corresponding to a second position, wherein the transmission apparatus comprises:
    an evaluating unit which evaluates at least one of a level of a direct sound transmitted from the first position to the second position without intervention of the first microphone and the speaker, a noise level, and an operating state of a noise source; and
    a delay setting unit which sets a transmission delay from the first microphone to the speaker based on an evaluation result of the evaluating unit.

2. The transmission apparatus according to claim 1, further comprising a sound signal processing unit which performs signal processing on the sound signal input from the first microphone to output to the speaker, wherein
    the delay setting unit sets a transmission delay from inputting the sound signal to the sound signal processing unit from the first microphone to outputting a sound signal after signal processing to the speaker.

3. The transmission apparatus according to claim 2, wherein the sound signal processing unit performs signal processing for reducing a signal component other then an objective signal in the sound signal input from the first microphone, and outputs a sound signal after the signal processing to the speaker.

4. The transmission apparatus according to claim 2, wherein the sound signal processing unit comprises:
    an echo cancelling unit which cancels echo from the sound signal; and
    a variable buffer unit which is provided in a transmission path from inputting the sound signal from the first microphone to outputting a sound signal after signal processing to the speaker, and delays the sound signal input thereto by a variable amount before outputting.

5. The transmission apparatus according to claim 2, wherein the sound signal processing unit comprises:
    a noise removing unit which removes at least a part of noise in the sound signal; and
    a switching unit which switches whether or not to bypass noise removal of the noise removing unit in signal processing of the sound signal according to setting of the delay setting unit.

6. The transmission apparatus according to claim 2, comprising a noise removing unit which removes at least a part of noise in the sound signal, wherein
    the delay setting unit sets a time required by the noise removing unit for noise removal based on an evaluation result of the evaluating unit.

7. The transmission apparatus according to claim 2, wherein
    the sound signal processing unit comprises a filtering unit which performs filtering on the sound signal, and
    the delay setting unit sets, based on an evaluation result of the evaluating unit, a number of stages of filtering of the filtering unit.

8. The transmission apparatus according to claim 1, wherein the evaluating unit generates an evaluation result based on at least one of a signal level of an objective signal, a noise level, and an S/N ratio in the sound signal input from the first microphone.

9. The transmission apparatus according to claim 8, wherein the evaluating unit generates an evaluation result based on a sound signal which is input from the first microphone and from which echo is cancelled.

10. The transmission apparatus according to claim 1, wherein the evaluating unit generates an evaluation result based on at least one of a signal level of an objective signal, a noise level, and an S/N ratio in a sound signal input from a second microphone provided corresponding to the second position.

11. The transmission apparatus according to claim 1, wherein the evaluating unit evaluates, as the operating state of the noise source, at least one of an operating state of a power source provided to an installation target of the transmission apparatus, an operating state of an air conditioner provided to the installation target, and movement noise in a case where the installation target is a vehicle.

12. The transmission apparatus according to claim 1, wherein the transmission apparatus is provided to a vehicle, and transmits a sound signal from the first microphone provided corresponding to a first row of seats of the vehicle as the first position to the speaker provided corresponding to a second row of seats of the vehicle as the second position.

13. A transmission system comprising:
    a first transmission apparatus which is the transmission apparatus according to claim 1,
    a second transmission apparatus which is the transmission apparatus according to claim 1 and transmits a sound signal from a microphone provided corresponding to the second position of the first transmission apparatus to a speaker provided corresponding to the first position of the first transmission apparatus.

14. A transmission method for transmitting a sound signal from a first microphone provided corresponding to a first position to a speaker provided corresponding to a second position, wherein the transmission method comprises:
    an evaluation step to evaluate at least one of a level of a direct sound transmitted from the first position to the second position without intervention of the first microphone and the speaker, a noise level, and an operating state of a noise source; and
    a delay setting step to set a transmission delay from the first microphone to the speaker based on an evaluation result of the evaluation step.

15. A non-transitory computer readable medium having recorded thereon a program which causes a computer to function as a transmission apparatus which transmits a sound signal from a first microphone provided corresponding to a first position to a speaker provided corresponding to a second position, wherein
    the transmission apparatus comprises:
        an evaluating unit which evaluates at least one of a level of a direct sound transmitted from the first position to the second position without intervention of the first microphone and the speaker, a noise level, and an operating state of a noise source; and a delay setting unit which sets a transmission delay from the first microphone to the speaker based on an evaluation result of the evaluating unit.

* * * * *